US012780166B2

(12) United States Patent
Rao et al.

(10) Patent No.: US 12,780,166 B2
(45) Date of Patent: Nov. 3, 2026

(54) WHEEL BRAKE APPARATUS, CONTROL METHOD, ELECTROMECHANICAL BRAKE SYSTEM, AND ELECTRIC VEHICLE

(71) Applicant: Huawei Digital Power Technologies Co., Ltd., Shenzhen (CN)

(72) Inventors: Rui Rao, Wuhan (CN); Chongxi Huang, Shanghai (CN); Yubiao Wu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 77 days.

(21) Appl. No.: 19/003,149

(22) Filed: Dec. 27, 2024

(65) Prior Publication Data

US 2025/0229758 A1 Jul. 17, 2025

(30) Foreign Application Priority Data

Dec. 29, 2023 (CN) ......................... 202311864523.6

(51) Int. Cl.

| | |
|---|---|
| ***B60T 13/74*** | (2006.01) |
| ***B60T 8/171*** | (2006.01) |
| ***F16D 65/18*** | (2006.01) |
| ***F16D 121/24*** | (2012.01) |
| ***F16D 127/06*** | (2012.01) |
| ***F16D 129/10*** | (2012.01) |

(52) U.S. Cl.

CPC ............ *B60T 13/741* (2013.01); *B60T 8/171* (2013.01); *B60T 13/746* (2013.01); *F16D 65/18* (2013.01); *F16D 2121/24* (2013.01); *F16D 2127/06* (2013.01); *F16D 2129/10* (2013.01)

(58) Field of Classification Search

None

See application file for complete search history.

(56) References Cited

U.S. PATENT DOCUMENTS 7,540,571 B2 * 6/2009 Yamaguchi ............. B60T 1/005 188/71.9
8,296,029 B2 * 10/2012 Watanabe ............. B60T 13/662 188/72.3
8,776,958 B2 * 7/2014 Shiraki ................. F16D 65/567 188/71.9

(Continued)

FOREIGN PATENT DOCUMENTS

CN 1415508 A * 5/2003 ............ B60T 13/746
CN 1221423 C * 10/2005 ............ B60T 13/746

(Continued)

*Primary Examiner* — Kevin R Steckbauer
(74) *Attorney, Agent, or Firm* — Maier & Maier, PLLC

(57) ABSTRACT

A wheel brake apparatus for an electric vehicle, a parking control method, and an electromechanical brake system. The wheel brake apparatus includes a wheel controller, a brake unit, and a parking unit. The brake unit includes a brake motor and a brake caliper. The brake motor is configured to drive the brake caliper to clamp a brake disc of the electric vehicle. The parking unit is configured to lock the brake motor when the electric vehicle is being parked. When the parking unit locks the brake motor, the brake motor rotates, so that a locking mechanism of the parking unit can more easily lock the brake motor, to improve a parking success rate and parking efficiency, and ensure safety and reliability of the electric vehicle.

18 Claims, 7 Drawing Sheets

(56) References Cited

U.S. PATENT DOCUMENTS

| | | | | | |
|---|---|---|---|---|---|
| 9,174,622 | B2 * | 11/2015 | Shiraki | B60T 13/746 | |
| 10,138,960 | B2 * | 11/2018 | Yasui | F16D 55/226 | |
| 10,343,667 | B2 * | 7/2019 | Tsukamoto | F16D 65/18 | |
| 10,502,277 | B2 * | 12/2019 | Masuda | B60T 13/741 | |
| 10,640,097 | B2 * | 5/2020 | Tsukamoto | B60T 8/172 | |
| 10,752,229 | B2 * | 8/2020 | Yasui | B60T 1/062 | |
| 10,759,407 | B2 * | 9/2020 | Hanzawa | B60T 8/172 | |
| 11,953,067 | B2 * | 4/2024 | Kokrehel | F16D 65/18 | |
| 11,958,460 | B2 * | 4/2024 | Yang | B60T 8/171 | |
| 12,427,968 | B2 * | 9/2025 | Purane | B60T 13/746 | |
| 2005/0258683 | A1 * | 11/2005 | Yamaguchi | F16D 65/18 | 188/162 |
| 2009/0099748 | A1 * | 4/2009 | Watanabe | B60T 13/746 | 701/70 |
| 2011/0308898 | A1 * | 12/2011 | Shiraki | B60T 13/741 | 188/72.4 |
| 2014/0069750 | A1 * | 3/2014 | Nohira | B60T 13/741 | 188/71.8 |
| 2017/0234380 | A1 * | 8/2017 | Yasui | F16D 63/006 | 188/72.1 |
| 2018/0009420 | A1 * | 1/2018 | Tsukamoto | B60T 13/741 | |
| 2018/0073585 | A1 * | 3/2018 | Masuda | F16D 55/226 | |
| 2018/0215369 | A1 * | 8/2018 | Tsukamoto | B60T 13/745 | |
| 2019/0241168 | A1 * | 8/2019 | Tada | H02P 3/04 | |
| 2022/0105919 | A1 * | 4/2022 | Masuda | B60T 7/107 | |
| 2022/0341478 | A1 * | 10/2022 | Kim | B60T 13/662 | |
| 2023/0066292 | A1 * | 3/2023 | Shin | B60T 13/746 | |
| 2025/0229758 | A1 * | 7/2025 | Rao | B60T 13/741 | |

FOREIGN PATENT DOCUMENTS

| | | | | | |
|---|---|---|---|---|---|
| CN | 106335487 | A | | 1/2017 | |
| CN | 107614919 | A | * | 1/2018 | F16D 65/14 |
| CN | 107614919 | B | * | 9/2019 | B60T 13/74 |
| CN | 110219911 | A | * | 9/2019 | B60T 13/74 |
| CN | 111619535 | A | * | 9/2020 | B60T 13/745 |
| CN | 109990021 | B | * | 11/2020 | F16D 65/14 |
| CN | 110219911 | B | * | 11/2020 | F16D 65/183 |
| CN | 212447476 | U | * | 2/2021 | |
| CN | 111469830 | B | | 6/2021 | |
| CN | 114368374 | A | | 4/2022 | |
| CN | 114382802 | A | * | 4/2022 | F16D 55/224 |
| CN | 114396439 | A | * | 4/2022 | F16D 65/18 |
| CN | 115503670 | A | | 12/2022 | |
| CN | 116428291 | A | * | 7/2023 | F16D 65/18 |
| CN | 117905879 | A | * | 4/2024 | F16H 63/36 |
| CN | 117962842 | A | * | 5/2024 | B60T 8/171 |
| CN | 116428291 | B | * | 7/2025 | F16D 66/00 |
| CN | 120922086 | A | * | 11/2025 | B60T 7/10 |
| CN | 223563443 | U | * | 11/2025 | |
| CN | 121088761 | A | * | 12/2025 | F16D 65/18 |
| CN | 121345917 | A | * | 1/2026 | F16D 55/22 |
| CN | 121375724 | A | * | 1/2026 | |
| CN | 223768085 | U | * | 1/2026 | |
| CN | 121626073 | A | * | 3/2026 | F16D 66/00 |
| CN | 121782359 | A | * | 4/2026 | B60T 1/062 |
| DE | 112016000900 | T5 | * | 11/2017 | B60T 13/74 |
| DE | 112016000912 | T5 | * | 11/2017 | F16D 66/00 |
| DE | 112016000900 | B4 | * | 3/2023 | F16D 65/18 |
| EP | 3078876 | B1 | * | 7/2020 | F16D 55/226 |
| EP | 4578749 | A1 | * | 7/2025 | B60T 8/171 |
| GB | 2366341 | A | * | 3/2002 | B60T 13/741 |
| KR | 20240150038 | A | * | 10/2024 | B60T 1/065 |
| WO | WO-2015083798 | A1 | * | 6/2015 | B60T 13/741 |
| WO | WO-2016185937 | A1 | * | 11/2016 | B60T 17/22 |
| WO | 2018133830 | A1 | | 7/2018 | |

* cited by examiner

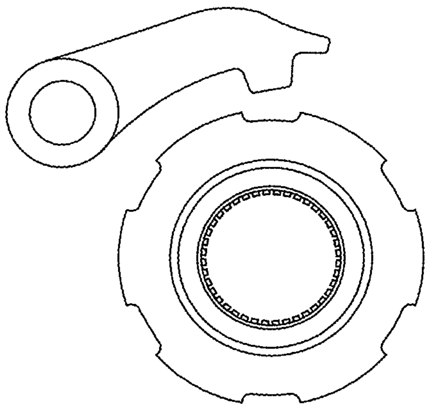
FIG. 9a
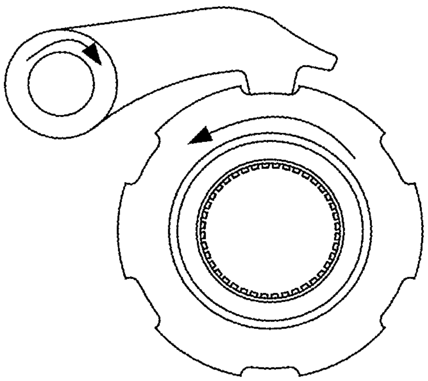
FIG. 9b
FIG. 9
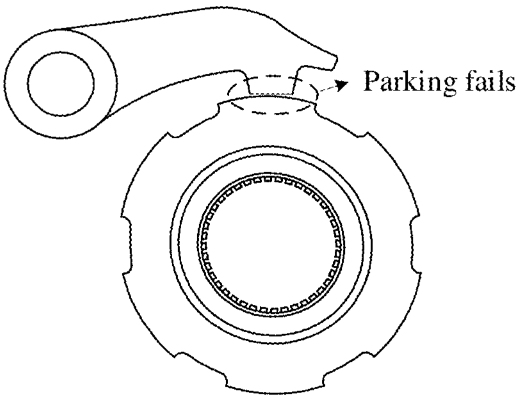
FIG. 10

WHEEL BRAKE APPARATUS, CONTROL METHOD, ELECTROMECHANICAL BRAKE SYSTEM, AND ELECTRIC VEHICLE

CROSS-REFERENCE TO RELATED APPLICATIONS

This application claims priority to Chinese Patent Application No. 202311864523.6, filed on Dec. 29, 2023, which is hereby incorporated by reference in its entirety.

TECHNICAL FIELD

The embodiments relate to the field of vehicle braking, and to a wheel brake apparatus, a parking control method, an electromechanical brake system, and an electric vehicle.

BACKGROUND

An electronic parking electromechanical brake system (EPB) can substitute electronic control for original mechanical manual operations performed through a parking brake handle, a cable, and the like, to complete parking. Featuring convenience, safety, and high efficiency, the electronic parking electromechanical brake system has developed rapidly. The electronic parking electromechanical brake system has various implementations. In a common implementation, a brake motor in an electromechanical brake system is locked through a locking mechanism to implement parking. However, in the conventional technology, when the electronic parking electromechanical brake system locks the brake motor to implement parking, parking often fails because it is difficult for the locking mechanism to accurately engage. This significantly affects parking efficiency and safety.

SUMMARY

The embodiments provide a wheel brake apparatus, a parking control method, an electromechanical brake system, and an electric vehicle, to improve parking efficiency and a parking success rate of the electric vehicle, and avoid that an accident such as vehicle rollaway happens because the electric vehicle fails to be parked.

According to a first aspect, the embodiments provide a wheel brake apparatus for an electric vehicle. The wheel brake apparatus includes a brake unit, a parking unit, and a wheel controller. The brake unit includes a brake motor and a brake caliper. The brake motor is configured to drive the brake caliper to clamp a brake disc of the electric vehicle. The parking unit is configured to lock the brake motor. The wheel controller is configured to control the brake motor to rotate forward to drive the brake caliper to clamp the brake disc, and then control the parking unit to lock the brake motor when the brake motor rotates backward.

As a braking technology develops, an electromechanical brake system has developed rapidly due to its features of a high response speed and high braking safety. The electromechanical brake system includes four wheel brake apparatuses that provide a brake force for wheels. Each wheel brake apparatus includes a brake motor and a brake caliper. The brake motor provides a brake force for a vehicle by driving the brake caliper to clamp a brake disc. The wheel brake apparatus provided in the embodiments further integrates a parking function. The wheel brake apparatus provided in this application implements the parking function by locking the brake motor. For example, during parking, the brake motor drives the brake caliper to clamp the brake disc first, and then the parking motor drives the locking mechanism to lock the brake motor, so that the brake caliper remains in a state of clamping the brake disc, to implement parking.

For example, the parking unit includes the parking motor and the locking mechanism. The parking motor is configured to drive the locking mechanism to lock the brake motor when the electric vehicle is being parked. The brake motor and the parking motor rotate in opposite directions when the parking motor drives the locking mechanism to lock the brake motor.

The following is defined: the brake motor rotates forward when the brake motor drives the brake caliper to clamp the brake disc, and the brake motor rotates backward when the brake motor drives the brake caliper to loosen the brake disc. The parking unit of the wheel brake apparatus provided in this application is configured to lock the brake motor when the brake motor rotates backward, so that the locking mechanism can more easily lock the brake motor, to improve parking efficiency and a parking success rate, and further improve safety and operation reliability of the electric vehicle.

In an implementation of the first aspect, the wheel controller is configured to: in response to that a clamping force output by the brake caliper after the brake caliper clamps the brake disc is less than a preset clamping force, control the brake motor to rotate forward to drive the brake caliper to clamp the brake disc again. The wheel controller is configured to: in response to that the clamping force output by the brake caliper after the brake caliper clamps the brake disc is greater than or equal to the preset clamping force, control the parking unit to lock the brake motor when the brake motor rotates backward.

Before the brake motor and the parking motor rotate in opposite directions to lock the brake motor, the wheel controller first controls the brake motor to drive the brake caliper to preclamp the brake disc, that is, the brake caliper further clamps the brake disc first, to avoid a risk that the electric vehicle rolls away due to a clamping force that is insufficient because the clamping force output by the brake caliper decreases when the brake motor rotates during parking. The preset clamping force is a clamping force ensuring that the brake caliper does not loosen the brake disc when the brake motor rotates backward. The wheel controller needs to control the brake motor to rotate backward for parking after the brake disc is fully clamped, so that parking reliability of the electromechanical brake system can be further improved.

In an implementation of the first aspect, the wheel controller is configured to: in response to controlling the brake motor and the parking motor to rotate in opposite directions for first preset duration, control the parking motor to stop rotating and the brake motor to output torque. The wheel controller is configured to: in response to that a change in a position angle of a rotor of the brake motor is less than a preset position angle change after the brake motor is controlled to output the torque for second preset duration, stop controlling the brake motor to output the torque. In response to that the change in the position angle of the rotor of the control motor is greater than or equal to the preset position angle change after the brake motor is controlled to output the torque for the second preset duration, the wheel controller recontrols the brake motor and the parking motor to rotate in opposite directions.

After the brake motor and the parking motor rotate in opposite directions for preset duration, the wheel controller considers that the parking is completed. At this time, the wheel controller performs parking verification. For example, the wheel controller controls the brake motor to output the torque. If the change in the position angle of the rotor of the brake motor is less than the preset position angle change, it indicates that the brake motor is locked, that is, the parking is successful. If the position angle of the rotor of the brake motor greatly changes after the wheel controller controls the brake motor to output the torque, that is, the rotor of the brake motor rotates a lot, it indicates that the brake motor is not successfully locked, that is, the parking fails. In this case, the wheel controller controls the brake motor and the parking motor to rotate in opposite directions to perform parking again. Through the foregoing operations, the wheel brake apparatus provided in this application can further improve the parking success rate and ensure parking safety. For example, the preset position angle change may be any value less than or equal to 180 degrees.

In an implementation of the first aspect, the wheel controller is configured to output a clamping signal and a parking drive signal in response to a parking control signal. The parking control signal is used to indicate that the electric vehicle is in a parked state. The clamping signal is used to control the brake motor to drive the brake caliper to clamp the brake disc. The parking drive signal is used to control the parking unit to lock the brake motor when the clamping force output by the brake caliper is greater than the preset clamping force.

In an implementation of the first aspect, a change in a rotor position angle in a process in which the brake motor drives the brake caliper to clamp the brake disc is greater than or equal to a change in a rotor position angle in a process in which the brake motor and the parking motor rotate in opposite directions. Alternatively, an increase in the clamping force output by the brake caliper in a process in which the brake motor drives the brake caliper to clamp the brake disc is greater than or equal to a decrease in the clamping force output by the brake caliper in a process in which the brake motor and the parking motor rotate in opposite directions.

That the change in the rotor position angle in the process in which the brake motor drives the brake caliper to clamp the brake disc is greater than the change in the rotor position angle in the process in which the brake motor and the parking motor rotate in opposite directions indicates that a forward rotation travel of the brake motor is greater than a backward rotation travel. This can ensure that the increase in the clamping force of the brake caliper is greater than the decrease in the clamping force.

In an implementation of the first aspect, a rotation speed of the brake motor in a process in which the brake motor drives the brake caliper to clamp the brake disc is greater than a rotation speed of the brake motor in a process in which the brake motor and the parking motor rotate in opposite directions.

The rotation speed of the brake motor is relatively high when the brake motor drives the brake caliper to clamp the brake disc. This ensures that the brake caliper can quickly output the clamping force until the clamping force is greater than the preset clamping force, so that parking efficiency can be improved. The rotation speed of the brake motor is relatively low during parking. This avoids that the brake caliper loosens the brake disc too much, resulting in an insufficient clamping force and the risk that the electric vehicle rolls away, so that parking reliability is improved.

In an implementation of the first aspect, the locking mechanism includes a pawl and a ratchet-wheel. The pawl is connected to a rotor of the parking motor. The ratchet-wheel is sleeved on the brake motor. The parking motor drives the pawl to engage with the ratchet-wheel when the parking unit is configured to lock the brake motor.

In an implementation of the first aspect, the wheel brake apparatus includes a clamping force sensor. The wheel controller is configured to receive a clamping force signal from the clamping force sensor. The clamping force signal is used to indicate the clamping force output by the brake caliper.

In an implementation of the first aspect, the wheel controller is configured to: in response to an unlocking control signal, control the parking unit to unlock the brake motor. The unlocking control signal is used to indicate that the electric vehicle cancels the parked state.

The wheel controller is configured to: in response to that the change in the position angle of the rotor of the control motor is less than the preset position angle change after the parking unit is controlled to unlock the brake motor for preset duration, recontrol the parking unit to unlock the brake motor.

If the electric vehicle is to cancel the parked state, the wheel controller controls the parking unit to stop locking the brake motor, so that the brake motor switches from a locked state to an unlocked state. After the parking unit unlocks the brake motor, the wheel controller performs unlocking verification. Specifically, the wheel controller controls the brake motor to output torque. If the change in the position angle of the rotor of the brake motor is greater than the preset position angle change, it indicates that the brake motor can freely rotate, that is, the unlocking is successful. If the change in the position angle of the rotor of the brake motor is less than or equal to the preset position angle change after the wheel controller controls the brake motor to output the torque, it indicates that the brake motor still cannot freely rotate and the brake motor is not successfully unlocked. In this case, the wheel controller controls the parking unit to unlock the brake motor again. Through the foregoing operations, the wheel brake apparatus provided in this application can further improve an unlocking success rate, to avoid that the electric vehicle is in a driving state when the brake motor is in the locked state to cause danger.

According to a second aspect, the embodiments provide a parking control method for an electric vehicle. The control method includes:

- controlling a brake motor to drive a brake caliper to clamp a brake disc; and
- in response to that a clamping force output by the brake caliper after the brake caliper clamps the brake disc is greater than a preset clamping force, controlling the brake motor and a parking motor to rotate in opposite directions, so that the parking motor drives a locking mechanism to lock the brake motor.

In an implementation of the second aspect, the control method includes:

- in response to that the brake motor and the parking motor rotate in opposite directions for first preset duration, controlling the brake motor to output torque;
- in response to that a change in a position angle of a rotor of the brake motor is greater than a preset rotor position angle change after the brake motor outputs the torque for second preset duration, recontrolling the brake motor and the parking motor to rotate in opposite directions, so that the parking motor drives the locking mechanism to lock the brake motor; and
- in response to that the change in the position angle of the rotor of the brake motor is less than or equal to the preset rotor position angle change after the brake motor outputs the torque for the second preset duration, controlling the brake motor to stop outputting the torque.

Beneficial effects of the parking control method provided in the second aspect of the embodiments are the same as those of the wheel brake apparatus provided in the first aspect. Details are not described herein again.

According to a third aspect, the embodiments provide an electromechanical brake system. The electromechanical brake system includes the wheel brake apparatus according to the first aspect and a central controller. The central controller is configured to: in response to a brake signal, control the brake motor to drive the brake caliper to clamp the brake disc. The brake signal is used to indicate that the electric vehicle is in a braking state. The central controller is configured to output a parking control signal in response to a parking signal. The parking signal is used to indicate that the electric vehicle enters a parked state. The central controller is configured to output an unlocking control signal in response to an unlocking signal. The unlocking signal is used to indicate that the electric vehicle exits the parked state.

According to a fourth aspect, the embodiments provide an electric vehicle. The electric vehicle includes the electromechanical brake system according to the third aspect.

Beneficial effects of the electromechanical brake system provided in the third aspect of the embodiments and the electric vehicle provided in the fourth aspect of the embodiments are the same as those of the wheel brake apparatus provided in the first aspect of the embodiments. Details are not described herein again.

BRIEF DESCRIPTION OF DRAWINGS

FIG. 9 is another diagram of a parking unit according to an embodiment;

FIG. 10 is another diagram of a parking unit according to an embodiment.

DETAILED DESCRIPTION OF EMBODIMENTS

The following describes technical solutions in specific implementations of the embodiments with reference to accompanying drawings in the implementations. Before specific content of the solutions is described, terms used herein are first briefly described.

In the embodiments, the words "first", "second", "third", and the like or similar words such as a module A, a module B, and a module C are merely used to distinguish between similar objects, and do not represent a specific order of the objects. It may be understood that specific orders or sequences may be exchanged if permitted, so that embodiments described herein can be implemented in an order other than an order illustrated or described herein.

The term "include" used herein should not be construed as being limited to the content listed below; and the term does not exclude other elements or steps. Accordingly, it should be interpreted as specifying the presence of the feature, whole, step, or component mentioned, but does not preclude the presence or addition of one or more other features, wholes, steps, or components and groups thereof. Therefore, the expression "device including apparatuses A and B" should not be limited to device consisting of only components A and B.

"One embodiment" or "an embodiment" mentioned herein mean that a specific feature, structure, or characteristic described in combination with this embodiment is included in at least one embodiment of this application. Therefore, the expression "in one embodiment" or "in an embodiment" does not necessarily indicate a same embodiment, but may indicate a same embodiment. Further, in one or more embodiments, the particular feature, structure, or characteristic can be combined in any proper manner, as will be clear from the embodiments to a person of ordinary skill in the art.

Unless otherwise defined, all technical and scientific terms used herein have same meanings as those usually understood by a person skilled in the art of the embodiments. In case of any inconsistency, the meaning described herein or the meaning obtained based on the content recorded herein shall be used. In addition, the terms used are merely for the purpose of describing embodiments, but are not intended as limiting.

The embodiments provide a wheel brake apparatus, an electromechanical brake system, and a parking method for an electric vehicle. According to solutions provided in the embodiments, when an electric vehicle 01 is being parked, a parking motor 1321 and a brake motor 1311 simultaneously rotate in opposite directions, so that a success rate of locking the brake motor 1311 during the parking can be improved. In addition, in the solutions of the embodiments, parking verification may be performed after the electric vehicle 01 is parked, to avoid a parking failure. A wheel brake apparatus 13 and the electromechanical brake system provided in the embodiments can improve parking safety and reliability of the electric vehicle 01.

Figure 1:
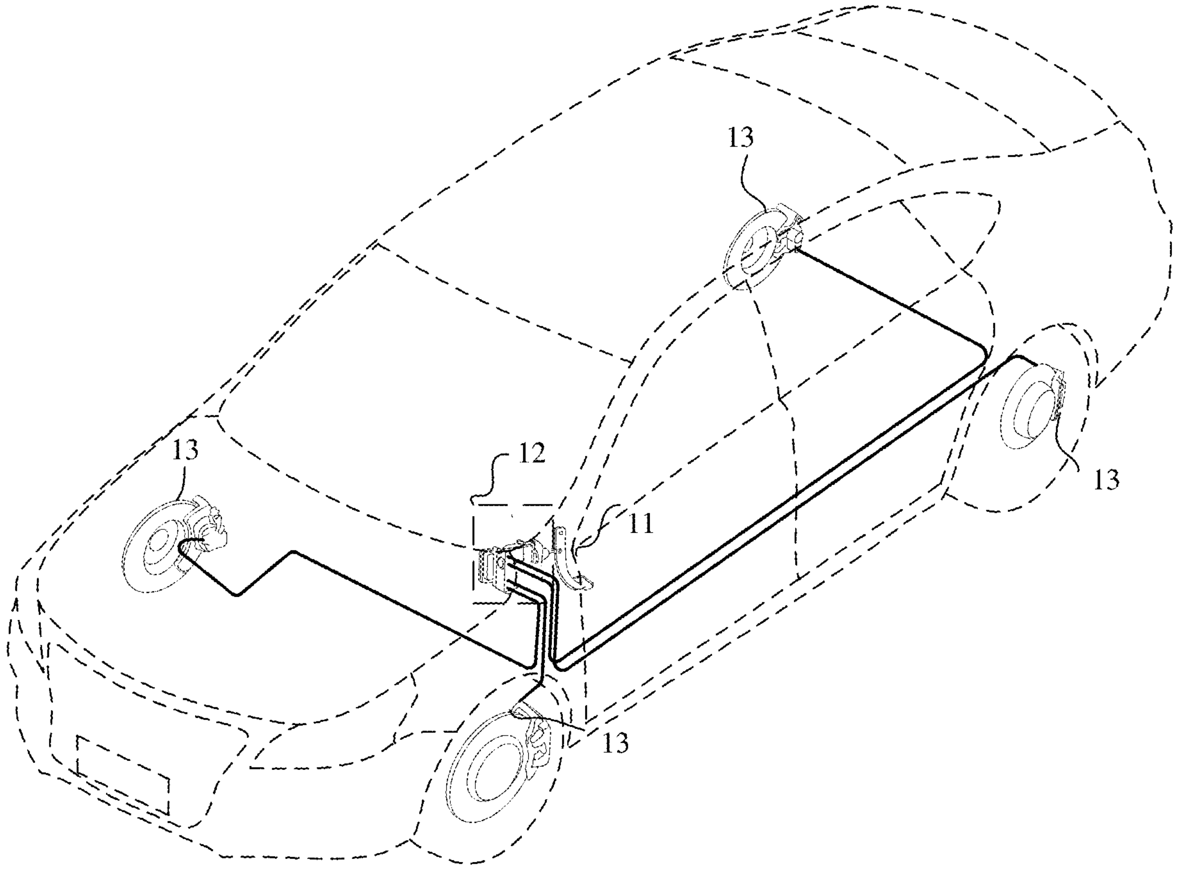
FIG. 1 is a diagram of an electric vehicle according to an embodiment.

FIG. 1 is a diagram of the electric vehicle 01 according to an embodiment. As shown in FIG. 1, the electric vehicle 01 includes wheels 20 and an electromechanical brake system 10. The electromechanical brake system 10 includes a brake pedal 11, a central controller 12, and four wheel brake apparatuses 13. When the electric vehicle 01 needs to brake during driving, a driver steps on the brake pedal 11. The central controller 12 receives a brake signal from the brake pedal 11, and outputs a torque signal to the four wheel brake apparatuses 13. The wheel brake apparatus 13 is configured to receive the torque signal and output a brake force to a brake disc 14 as indicated by the torque signal.

Figure 2:
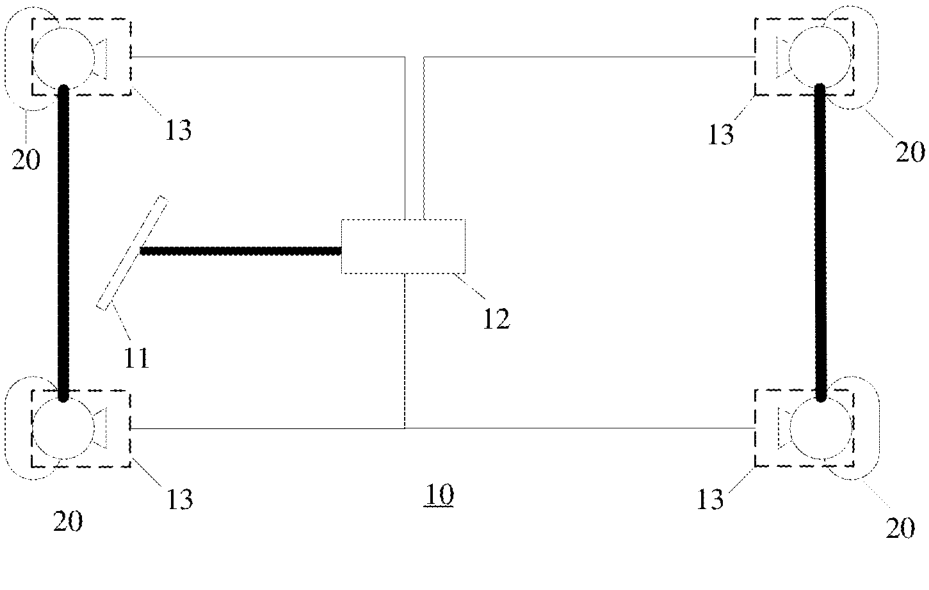
FIG. 2 is a diagram of an electromechanical brake system according to an embodiment.

FIG. 2 is a diagram of the electromechanical brake system 10 according to an embodiment. As shown in FIG. 2, the wheel brake apparatus 13 includes a wheel controller 133 and a service brake unit 131. The service brake unit 131 includes the brake motor 1311 and a brake caliper 1312.

When the electric vehicle 01 is braking, the wheel controller 133 is configured to receive the torque signal from the central controller 12 and output a drive current. The drive current is used to drive the brake motor 1311 to output torque indicated by the torque signal. The brake motor 1311 is configured to drive the brake caliper 1312 to clamp the brake disc 14. In this way, the brake caliper 1312 outputs a friction brake force to the brake disc 14, so that the electric vehicle 01 generates a deceleration.

Figure 3:
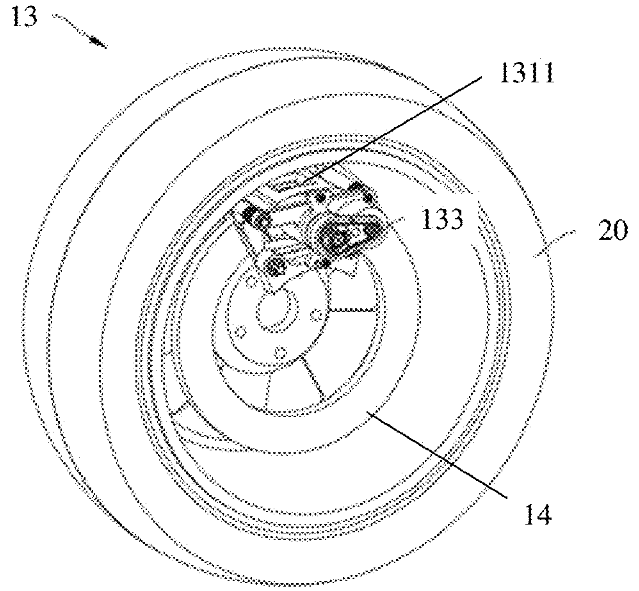
FIG. 3 is a diagram of a structure of a wheel brake apparatus according to an embodiment.
Figure 4:
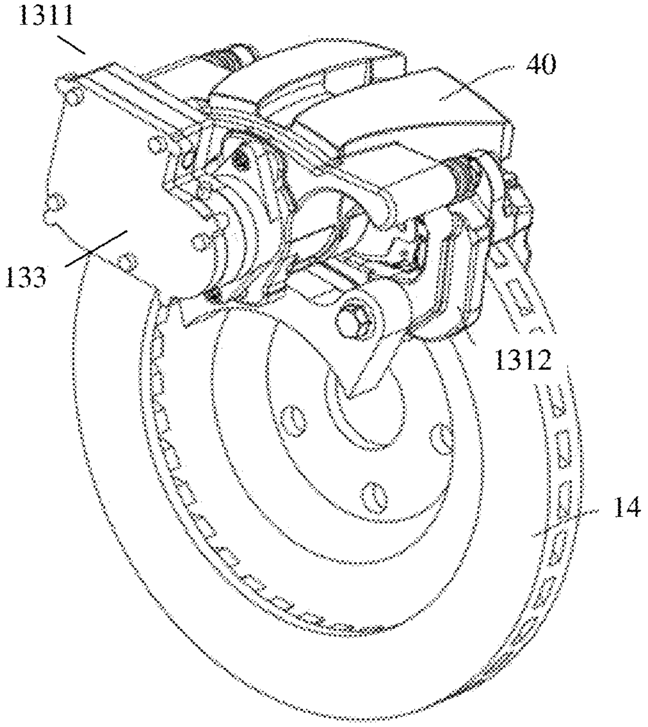
FIG. 4 is a diagram of another structure of a wheel brake apparatus according to an embodiment.

FIG. 3 and FIG. 4 are diagrams of the wheel brake apparatus 13 according to an embodiment. As shown in FIG. 3 or FIG. 4, a brake actuator includes the brake caliper 1312. When the electric vehicle 01 is braking, the wheel controller 133 drives the brake motor 1311 to generate the torque, and the brake motor 1311 drives the brake caliper 1312 to clamp the brake disc 14.

The electromechanical brake system 10 provided in embodiments integrates a parking function. At least one of the four wheel brake apparatuses 13 in the electromechanical brake system integrates a parking brake unit 132. The parking brake unit 132 includes the parking motor 1321 and a parking actuator 1322. The parking motor 1321 is configured to drive the parking actuator 1322 to lock the brake motor 1311. When the electric vehicle 01 is being parked, the brake motor 1311 drives the brake caliper 1312 to clamp the brake disc 14 first, and then the parking brake unit 132 locks the brake motor 1311, so that the brake caliper 1312 remains in a state of clamping the brake disc 14, and the electric vehicle 01 remains in a parked state. In an embodiment, the wheel brake apparatuses 13 corresponding to one or both rear wheels of the electric vehicle 01 integrate the parking brake unit 132. In an embodiment, the wheel brake apparatuses 13 corresponding to the four wheels 20 of the electric vehicle 01 integrate the parking brake unit 132.

Figure 5:
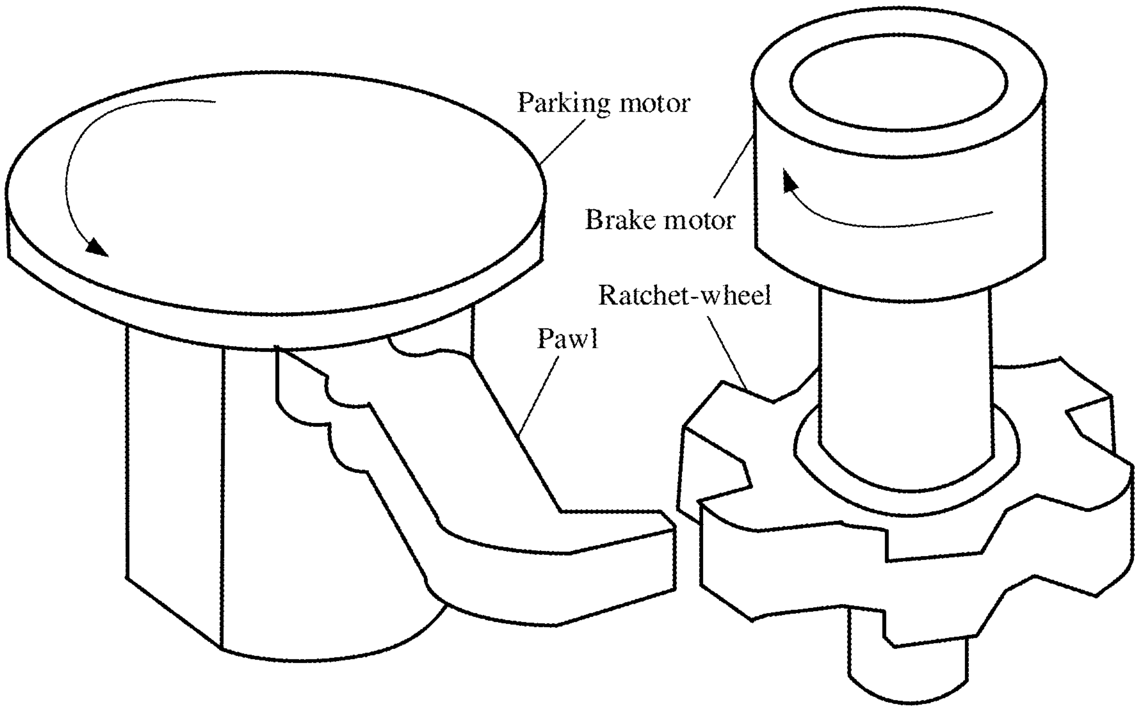
FIG. 5 is a diagram of a structure of a parking unit according to an embodiment.

FIG. 5 is a diagram of the parking brake unit 132 according to an embodiment. As shown in FIG. 5, the parking brake unit 132 includes the parking motor 1321 and the parking actuator 1322. The parking actuator 1322 includes a pawl and a ratchet-wheel that engage with each other. The pawl is disposed on a rotor of the parking motor 1321. When the parking motor 1321 rotates, the pawl can be driven to rotate along with the rotation of the rotor of the parking motor 1321. The ratchet-wheel is sleeved on a rotor of the brake motor 1311. When the electric vehicle 01 is being parked, the parking motor 1321 rotates to drive the pawl to rotate, and the pawl can be stuck in a gear groove of the ratchet-wheel, to lock the brake motor 1311.

It should be noted that FIG. 5 shows a structural example for ease of describing a function of the parking brake unit 132. Actually, the parking brake unit 132 provided in embodiments may further include various other different structural forms, provided that the parking brake unit 132 can lock the brake motor 1311 to implement the parking function. Details are not described herein.

Figure 6:
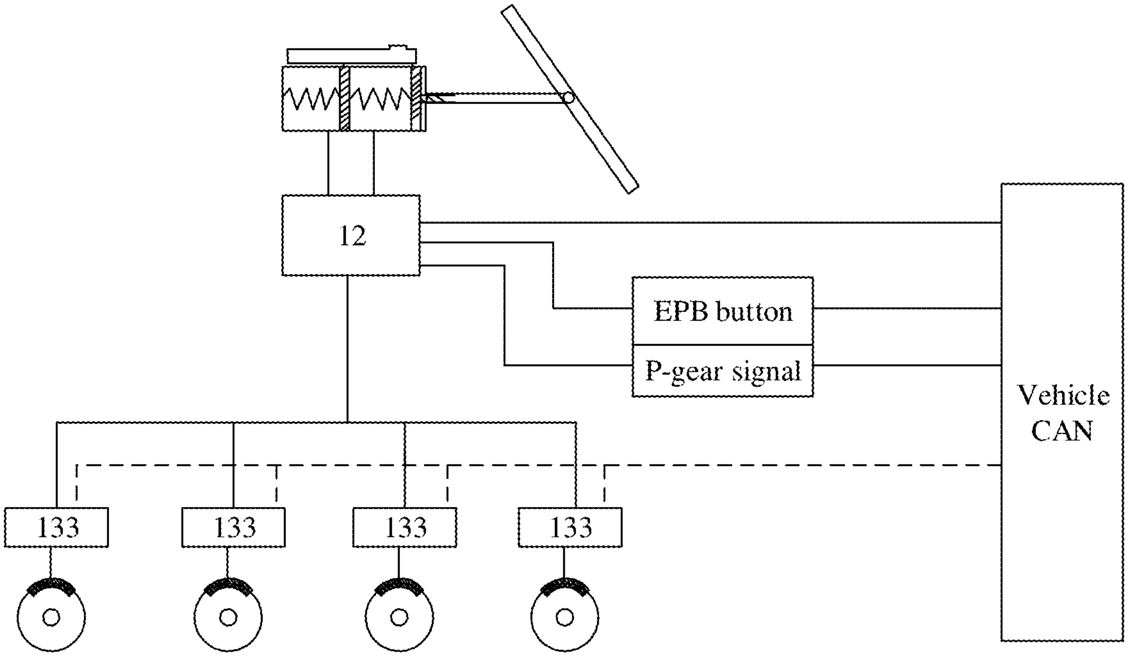
FIG. 6 is a diagram of a control architecture of an electromechanical brake system according to an embodiment.
Figure 7:
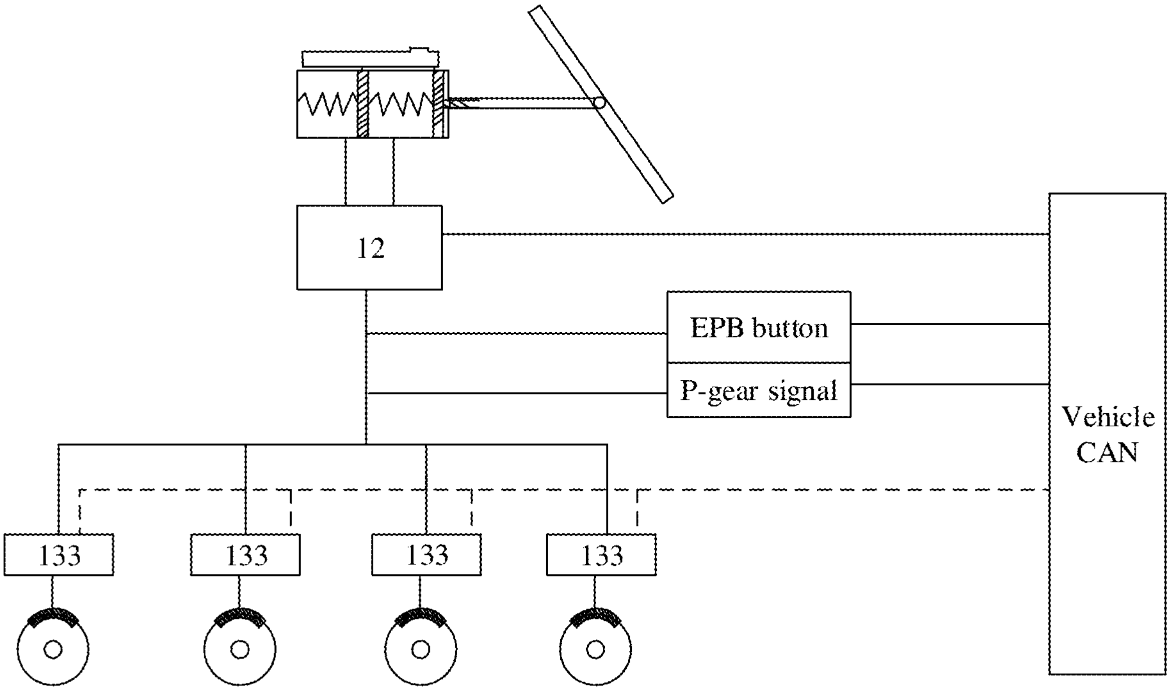
FIG. 7 is a diagram of a control architecture of an electromechanical brake system according to an embodiment.

FIG. 6 and FIG. 7 are diagrams of two control architectures of the electromechanical brake system 10.

FIG. 6 is a central control architecture of the electromechanical brake system 10. As shown in FIG. 6, the central controller 12 is configured to receive a brake signal or a parking signal. The central controller 12 is configured to output a control signal to the wheel brake apparatus 13 in response to the brake signal. The control signal is used to control the wheel brake apparatus 13 to output a brake force. The brake signal includes at least one of a travel signal from the brake pedal 11, a brake signal from an automated driving system, or a brake signal from a vehicle stabilization system.

The central controller 12 is configured to receive the parking signal. The parking signal may be a signal generated after the driver presses an EPB button in an electronic parking electromechanical brake system (EPB). At least one of the wheel brake apparatuses 13 includes the parking brake unit 132. For example, the two wheel brake apparatuses 13 corresponding to a rear axle of the electric vehicle 01 are provided with wheel brake units. After receiving the parking signal, the central controller 12 sends a parking instruction to the wheel controller 133. In response to the parking instruction, the wheel controller 133 controls the parking brake unit 132 to lock the brake motor 1311, to complete parking.

When the central controller 12 receives the parking signal during operation of the electric vehicle 01, the central controller 12 sends the parking signal to the wheel controller 133. The wheel controller 133 first controls the brake motor 1311 to drive the brake caliper 1312 to clamp the brake disc 14. After the brake disc 14 is clamped, the wheel controller 133 controls the parking motor 1321 to drive the parking actuator 1322 to lock the brake motor 1311, so that the brake caliper 1312 remains in the state of clamping the brake disc 14 without loosening it, and the electric vehicle 01 remains in the parked state.

The parking signal may come from the EPB system. After the driver presses the EPB button, the electronic parking electromechanical brake system generates the parking signal and sends the parking signal to the central controller 12, and the central controller 12 sends the parking signal to the wheel controller 133.

In embodiments, the parking signal may alternatively come from another parking system. For example, the parking signal may be generated after the driver adjusts a gear of the electric vehicle 01 to a P gear. Alternatively, the parking signal may come from an automatic parking system (auto hold). The wheel controller 133 may directly receive the parking signal. Alternatively, the central controller 12 may receive the parking signal first and then send the parking signal to the wheel controller 133.

FIG. 7 is a distributed control structure of the electromechanical brake system 10. As shown in FIG. 7, the wheel controller 133 may alternatively be configured to directly receive a brake signal or a parking signal. For example, the wheel controller 133 directly receives the parking signal from an EPB button and then controls the parking brake unit 132 to perform parking, or the wheel controller 133 directly receives the brake signal and then controls the brake unit to perform braking. The wheel controller 133 directly receives the brake signal and the parking signal and controls the brake unit and the parking brake unit 132, so that a signal transmission link can be shortened, making a control process faster and more accurate.

Figure 8:
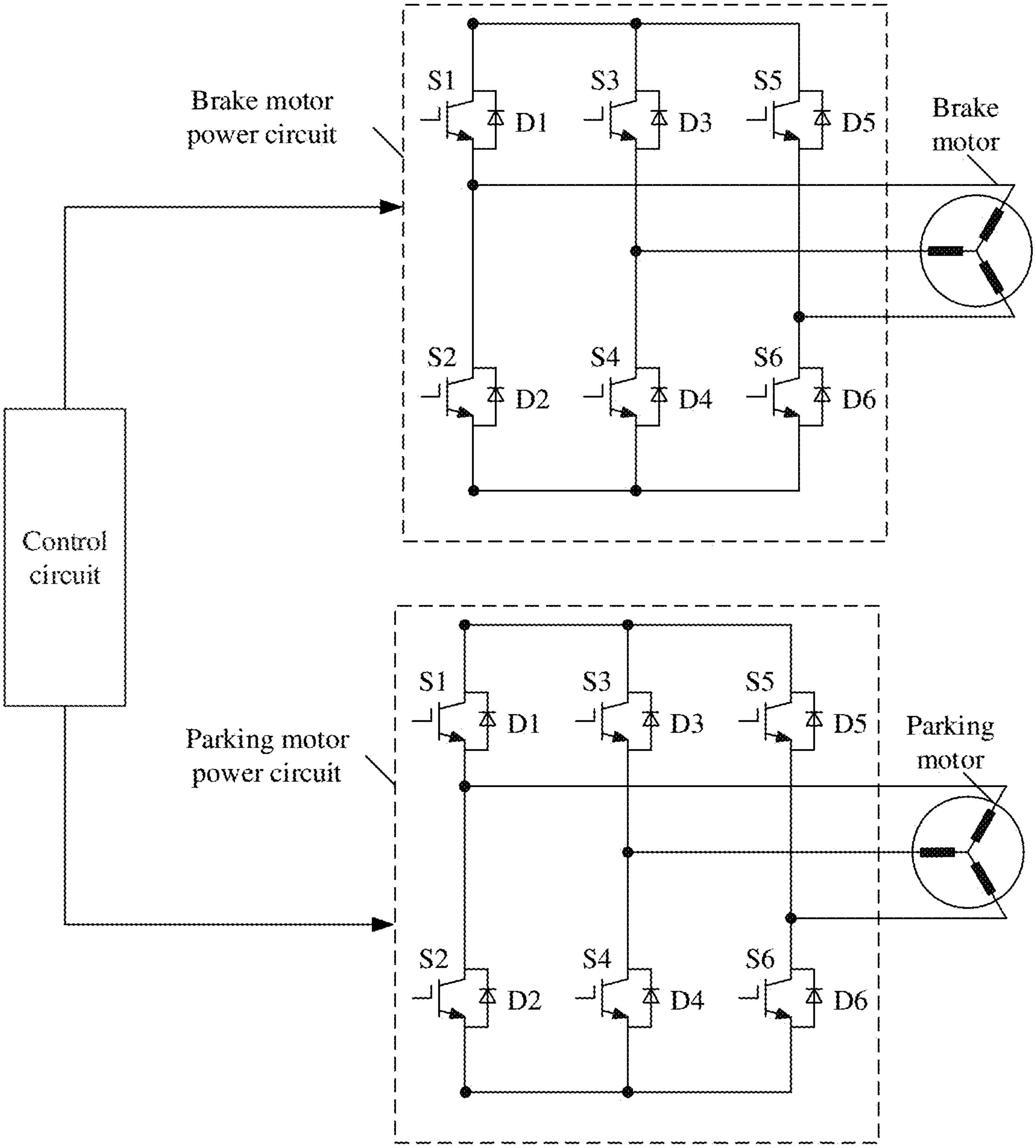
FIG. 8 is a diagram of a wheel controller according to an embodiment.

FIG. 8 is a diagram of a structure of the wheel controller 133. As shown in FIG. 8, the wheel controller 133 includes a control circuit 1331, a brake motor power circuit 1332, and a parking motor power circuit 1333. The brake motor power circuit 1332 includes a three-phase bridge arm. A bridge arm midpoint of the three-phase bridge arm in the brake motor power circuit 1332 is configured to be connected to a three-phase winding of the brake motor. The parking motor power circuit 1333 includes a three-phase bridge arm. A bridge arm midpoint of the three-phase bridge arm in the parking motor power circuit 1333 is configured to be connected to a three-phase winding of the parking motor 1321. The control circuit 1331 is configured to control the brake motor power circuit 1332 to output a brake motor drive current, to drive the brake motor 1311 to run; or control the parking motor power circuit 1333 to output a parking motor drive current, to drive the parking motor 1321 to run. In embodiments of this application, the control circuit 1331 may directly receive the brake signal or the parking signal to control the brake motor power circuit 1332 or the parking motor power circuit 1333. Alternatively, the control circuit 1331 may control the brake motor power circuit 1332 or the parking motor power circuit 1333 as indicated by the central controller 12.

FIG. 9 is a diagram of a process in which a locking mechanism locks the brake motor 1311. FIG. 9*a* is a diagram in which the electric vehicle 01 is not parked. As shown in FIG. 9*a*, when the electric vehicle 01 is not parked, the pawl is outside an intertooth groove of the ratchet-wheel, and the rotor of the brake motor 1311 can freely rotate, that is, the brake motor 1311 is not locked. As shown in FIG. 9*b*, when the electric vehicle 01 is parked, the pawl is stuck in an intertooth groove of the ratchet-wheel, and the rotor of the brake motor is locked and cannot freely rotate. Because the brake motor 1311 cannot rotate, the brake caliper 1312 can remain in the state of clamping the brake disc 14, so that the electric vehicle 01 can remain in the parked state.

When the parking motor 1321 drives the pawl to rotate to lock the brake motor 1311, if a claw portion of the pawl is in contact with a tooth top of the ratchet-wheel and is not stuck in an intertooth groove of the ratchet-wheel after rotation, the rotor of the brake motor 1311 can still rotate, and the parking motor 1321 is actually not locked. Consequently, the parking fails. The parking failure causes the electric vehicle 01 to have a risk of rolling away and the like, resulting in impact on operation safety and reliability of the electric vehicle 01.

With continued reference to FIG. 9 and FIG. 10, as shown in FIG. 9 and FIG. 10, when the electric vehicle 01 is being parked, the wheel controller 133 in the wheel brake apparatus 13 provided in embodiments is configured to control the brake motor 1311 to rotate forward, to drive the brake caliper 1312 to clamp the brake disc 14, and then control the parking unit to lock the brake motor 1311 when the brake motor 1311 rotates backward. That is, when the parking motor 1321 rotates to drive the pawl to approach the ratchet-wheel, the brake motor 1311 rotates in an opposite direction to drive the ratchet-wheel to rotate, so that the ratchet-wheel can be more easily stuck in an intertooth groove of the ratchet-wheel. This improves a parking success rate and the operation safety and reliability of the electric vehicle 01.

The following describes in detail a specific control process of this parking mode with reference to specific embodiments.

In embodiments, the wheel controller 133 is configured to output a clamping signal and a parking drive signal in response to a parking control signal. The parking control signal is used to indicate that the electric vehicle 01 is in the parked state. The clamping signal is used to control the brake motor 1311 to drive the brake caliper 1312 to clamp the brake disc 14. The parking drive signal is used to control the parking unit to lock the brake motor 1311 when a clamping force output by the brake caliper 1312 is greater than a preset clamping force.

The wheel controller 133 may directly or indirectly respond to the parking signal. For the distributed control architecture of the electromechanical brake system shown in FIG. 7, the wheel controller 133 may directly receive the parking signal. For example, the electronic parking electromechanical brake system is directly connected to the wheel controller 133. The parking signal may be directly received by the wheel controller 133 without passing through the central controller 12. This shortens the signal transmission link and improves a control speed and control accuracy. For the central control architecture of the electromechanical brake system shown in FIG. 6, the central controller 12 receives the parking signal, and then sends the parking control signal to the wheel controller 133. In this case, the wheel controller 133 does not directly receive the parking signal. Therefore, the response of the wheel controller 133 to the parking signal is indirect.

The clamping signal is used to control the brake motor 1311 to drive the brake caliper 1312 to further clamp the brake disc 14 before parking starts. In embodiments of this application, the wheel controller 133 is configured to: in response to that the clamping force output by the brake caliper 1312 after the brake caliper 1312 clamps the brake disc 14 is less than the preset clamping force, control the brake motor 1311 to rotate forward, to drive the brake caliper 1312 to clamp the brake disc 14 again. The wheel controller 133 is configured to: in response to that the clamping force output by the brake caliper 1312 after the brake caliper 1312 clamps the brake disc 14 is greater than or equal to the preset clamping force, control the parking unit to lock the brake motor 1311 when the brake motor 1311 rotates backward.

During parking, the parking motor 1321 rotates forward, and the brake motor 1311 rotates backward. When the brake motor 1311 rotates backward, the brake motor 1311 drives the brake caliper 1312 to decrease the output clamping force. Therefore, the wheel brake apparatus 13 provided in embodiments of this application further increases the clamping force on the brake disc 14 before parking, to ensure that the brake disc 14 can still be fully clamped after the brake motor 1311 rotates backward. This avoids that the vehicle rolls away due to an insufficient clamping force output by the brake caliper 1312 after parking. The following is defined: The brake motor 1311 rotates forward when the brake motor 1311 drives the brake caliper 1312 to clamp the brake disc 14, and the brake motor 1311 rotates backward when the brake motor 1311 drives the brake caliper 1312 to loosen the brake disc 14. When the brake motor 1311 rotates forward, the parking motor 1321 and the brake motor 1311 rotate in a same direction, and the parking motor 1321 rotates forward. The brake motor 1311 rotates forward before rotating backward, so that the clamping force output by the brake caliper 1312 can be further increased, to avoid that the clamping force decreases because the brake motor 1311 rotates backward and becomes insufficient. This can further improve parking reliability of the electromechanical brake system.

The brake caliper 1312 of the wheel brake apparatus 13 provided in embodiments may be provided with a clamping force sensor. The clamping force sensor may monitor the clamping force output by the brake caliper 1312 to the brake disc 14 and output a clamping force signal to the wheel controller 133 to indicate the clamping force actually output by the brake caliper 1312. After the wheel controller 133 outputs a preclamping signal, the wheel controller 133 outputs the parking drive signal to the brake motor 1311 and the parking motor 1321 in response to that the clamping force output by the brake caliper 1312 to the brake disc 14 and indicated by the clamping force signal is greater than the preset clamping force.

After outputting the clamping signal, the wheel controller 133 further outputs the parking drive signal. The parking drive signal is used to control the brake motor 1311 and the parking motor 1321 to simultaneously rotate in opposite directions. The parking motor 1321 drives the pawl to be stuck in an intertooth groove of the ratchet-wheel, to implement parking. During parking, the rotor of the brake motor 1311 and the rotor of the parking motor 1321 rotate in opposite directions. During parking, the rotor of the parking motor 1321 rotates forward to drive the pawl to approach the ratchet-wheel, and the brake motor 1311 slowly rotates backward, so that the pawl can more easily engage with the ratchet-wheel. When the brake motor 1311 rotates, because the brake motor 1311 rotates backward, the clamping force of the brake caliper 1312 on the brake disc 14 decreases as the brake motor 1311 rotates backward. However, because the brake motor 1311 rotates forward to preclamp the brake disc 14 before the brake motor 1311 rotates backward, although the clamping force of the brake caliper 1312 on the brake disc 14 decreases to some extent, the brake caliper 1312 remains in the state of clamping the brake disc 14, so that the electric vehicle 01 does not have a risk of rolling away. In addition, because a speed at which the brake motor 1311 rotates backward is extremely small, a limited clamping force is released. For example, a clamping force released when the brake motor 1311 rotates backward is less than a clamping force added by the brake caliper 1312 on the brake disc 14 during preclamping.

The parking drive signal includes a brake motor drive signal and a parking motor drive signal. After preclamping is completed, the brake motor drive signal is used to control the brake motor 1311 to rotate, and the parking motor drive signal is used to control the parking motor 1321 to rotate. The brake motor 1311 and the parking motor 1321 simultaneously rotate, so that the pawl can be more easily stuck in an intertooth groove of the ratchet-wheel. This can improve the parking success rate. For example, if the brake motor 1311 remains stationary and does not rotate and only the parking motor 1321 drives the pawl to rotate during parking, the claw portion of the pawl may fall on a tooth top of the ratchet-wheel after the pawl becomes in contact with the ratchet-wheel, resulting in a parking failure. However, if the brake motor 1311 and the parking motor 1321 simultaneously rotate during parking and the claw portion of the pawl is in contact with a tooth top of the ratchet-wheel, the brake motor 1311 can continue to rotate because the locking mechanism does not lock the brake motor 1311, until the claw portion of the pawl falls into an intertooth groove of the ratchet-wheel, so that the parking is successful.

In embodiments, when the brake motor 1311 rotates backward, the wheel controller 133 responds to that the clamping force indicated by the clamping force signal is less than a second preset clamping force. The control signal of the brake motor 1311 is used to control the brake motor 1311 to stop rotating, or the control signal of the brake motor 1311 is used to control the brake motor 1311 to rotate forward. The second preset clamping force is less than the first preset clamping force.

When the brake motor 1311 rotates backward during parking, to avoid a risk that the electric vehicle 01 rolls away because the clamping force released by the brake caliper 1312 is excessively large, the wheel controller 133 controls the brake motor 1311 to stop rotating or rotating forward when detecting that the clamping force indicated by the clamping force signal is less than the second preset clamping force.

In an embodiment, a change in a rotor position angle in a process in which the brake motor 1311 drives the brake caliper 1312 to clamp the brake disc 14 is greater than or equal to a change in a rotor position angle in a process in which the brake motor 1311 and the parking motor 1321 rotate in opposite directions. Alternatively, an increase in the clamping force output by the brake caliper 1312 in a process in which the brake motor 1311 drives the brake caliper 1312 to clamp the brake disc 14 is greater than or equal to a decrease in the clamping force output by the brake caliper 1312 in a process in which the brake motor 1311 and the parking motor 1321 rotate in opposite directions.

That the change in the rotor position angle in the process in which the brake motor 1311 drives the brake caliper 1312 to clamp the brake disc 14 is greater than the change in the rotor position angle in the process in which the brake motor 1311 and the parking motor 1321 rotate in opposite directions indicates that a forward rotation travel of the brake motor 1311 is greater than a backward rotation travel. This can ensure that the increase in the clamping force of the brake caliper 1312 is greater than the decrease in the clamping force.

In an embodiment, a rotation speed of the brake motor 1311 in a process in which the brake motor 1311 drives the brake caliper 1312 to clamp the brake disc 14 is greater than a rotation speed of the brake motor 1311 in a process in which the brake motor 1311 and the parking motor 1321 rotate in opposite directions.

The rotation speed of the brake motor 1311 is relatively high when the brake motor 1311 drives the brake caliper 1312 to clamp the brake disc 14. This ensures that the brake caliper 1312 can quickly output the clamping force until the clamping force is greater than the preset clamping force, so that parking efficiency can be improved. The rotation speed of the brake motor 1311 is relatively low during parking. This avoids that the brake caliper 1312 loosens the brake disc 14 too much, resulting in an insufficient clamping force and the risk that the electric vehicle 01 rolls away, so that parking reliability is improved.

After receiving the parking control signal for preset duration, the wheel controller 133 outputs a verification signal to verify whether the parking is successful. In embodiments of this application, after the parking ends, the wheel controller 133 further verifies whether the parking is successful.

In an embodiment, the wheel controller 133 is configured to: in response to controlling the brake motor 1311 and the parking motor 1321 to rotate in opposite directions for the preset duration, control the parking motor 1321 to stop rotating and output the verification signal. The verification signal is used to control the brake motor 1311 to output the torque.

The wheel controller 133 is configured to: in response to that the change in the position angle of the rotor of the brake motor 1311 is less than the preset position angle change after the brake motor 1311 is controlled to output the torque for the second preset duration, stop controlling the brake motor 1311 to output the torque.

In response to that the change in the position angle of the rotor of the control motor is greater than or equal to the preset position angle change after the brake motor 1311 is controlled to output the torque for the second preset duration, the wheel controller 133 recontrols the brake motor 1311 and the parking motor 1321 to rotate in opposite directions.

After the brake motor 1311 and the parking motor 1321 rotate in opposite directions for preset duration, the wheel controller 133 considers that the parking is completed. At this time, the wheel controller 133 performs parking verification. For example, the wheel controller 133 controls the brake motor 1311 to output the torque. If the change in the position angle of the rotor of the brake motor 1311 is less than the preset position angle change, it indicates that the brake motor 1311 is locked, that is, the parking is successful. If the position angle of the rotor of the brake motor 1311 greatly changes after the wheel controller 133 controls the brake motor 1311 to output the torque, that is, the rotor of the brake motor 1311 rotates a lot, it indicates that the brake motor 1311 is not successfully locked, that is, the parking fails. In this case, the wheel controller 133 controls the brake motor 1311 and the parking motor 1321 to rotate in opposite directions to perform parking again. Through the foregoing operations, the wheel brake apparatus 13 provided in this application can further improve the parking success rate and ensure parking safety.

In embodiments, if the electric vehicle 01 is to cancel the parked state to continue driving, the central controller 12 sends an unlocking control signal to the wheel controller 133. The wheel controller 133 is configured to: in response to the unlocking control signal, control the parking unit to unlock the brake motor 1311. The unlocking control signal is used to indicate that the electric vehicle 01 cancels the parked state. The wheel controller 133 is configured to: in response to that the change in the position angle of the rotor of the control motor is less than the preset position angle change after the parking unit is controlled to unlock the brake motor 1311 for preset duration, recontrol the parking unit to unlock the brake motor 1311.

If the electric vehicle 01 is to cancel the parked state, the wheel controller 133 controls the parking unit to stop locking the brake motor 1311, so that the brake motor 1311 switches from a locked state to an unlocked state. After the parking unit unlocks the brake motor 1311, the wheel controller 133 performs unlocking verification. For example, the wheel controller 133 controls the brake motor 1311 to output torque. If the change in the position angle of the rotor of the brake motor 1311 is greater than the preset position angle change, it indicates that the brake motor 1311 can freely rotate, that is, the unlocking is successful. If the change in the position angle of the rotor of the brake motor 1311 is less than or equal to the preset position angle change after the wheel controller 133 controls the brake motor 1311 to output the torque, it indicates that the brake motor 1311 still cannot freely rotate and the brake motor 1311 is not successfully unlocked. In this case, the wheel controller 133 controls the parking unit to unlock the brake motor 1311 again. Through the foregoing operations, the wheel brake apparatus 13 provided in the embodiments can further improve an unlocking success rate, to avoid that the electric vehicle 01 is in a driving state when the brake motor 1311 is in the locked state to cause danger.

In an implementation, the wheel controller 133 is configured to output a parking failure alarm signal in response to that the brake motor 1311 remains unlocked after the parking signal is received for third preset duration. The parking failure alarm signal is used to indicate that parking fails. The central controller 12 receives the parking failure alarm signal, and reminds the driver of the parking failure by turning on a lamp, making an alarm sound, or the like.

For example, the third preset duration may be any duration greater than 1 minute.

The wheel controller 133 is configured to output an unlocking failure alarm signal in response to that the brake motor 1311 remains locked after an unlocking signal is received for the third preset duration. The unlocking failure alarm signal is used to indicate unlocking fails. The central controller 12 receives the unlocking failure alarm signal, and reminds the driver of the unlocking failure by turning on a lamp, making an alarm sound, or the like.

Based on the foregoing embodiments, embodiments further provide a parking control method for the electric vehicle 01. The control method includes:

controlling the brake motor 1311 to drive the brake caliper 1312 to clamp the brake disc 14; and in response to that the clamping force output by the brake caliper 1312 after the brake caliper 1312 clamps the brake disc 14 is greater than the preset clamping force, controlling the brake motor 1311 and the parking motor 1321 to rotate in opposite directions, so that the parking motor 1321 drives the locking mechanism to lock the brake motor 1311.

In an embodiment, the control method includes:

in response to that the brake motor 1311 and the parking motor 1321 rotate in opposite directions for the first preset duration, controlling the brake motor 1311 to output torque;

in response to that the change in the position angle of the rotor of the brake motor 1311 is greater than the preset rotor position angle change after the brake motor 1311 outputs the torque for the second preset duration, recontrolling the brake motor 1311 and the parking motor 1321 to rotate in opposite directions, so that the parking motor 1321 drives the locking mechanism to lock the brake motor 1311; and in response to that the change in the position angle of the rotor of the brake motor 1311 is less than or equal to the preset rotor position angle change after the brake motor 1311 outputs the torque for the second preset duration, controlling the brake motor 1311 to stop outputting the torque.

Figure 11:
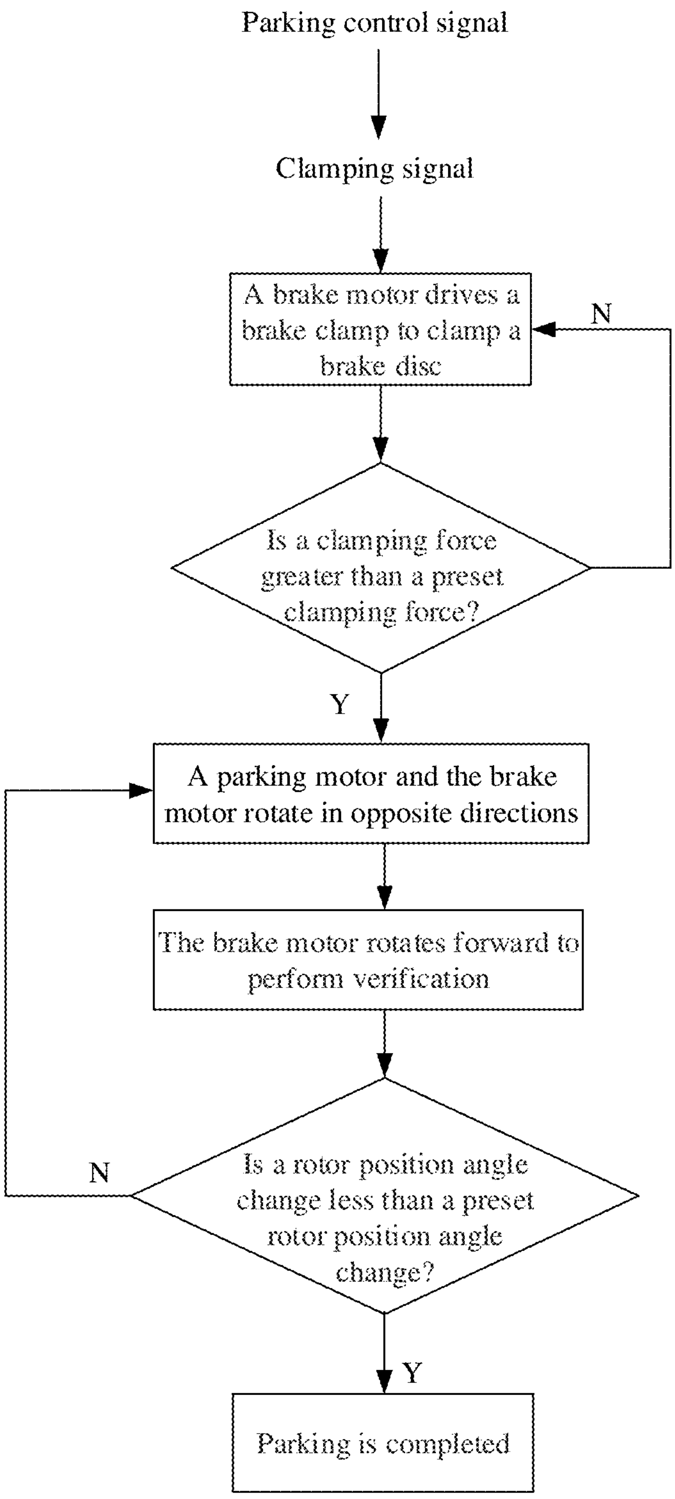
FIG. 11 is a diagram of performing a parking control method according to an embodiment.

FIG. 11 is a diagram of performing the parking control method according to the embodiments. Details of content in FIG. 11 are not described herein again.

Although is the embodiments described with reference to specific features and embodiments thereof, it is clear that various modifications and combinations may be made to them without departing from their scope. Correspondingly, the embodiments and accompanying drawings are merely example descriptions, and are considered as any of or all modifications, variations, combinations or equivalents that cover the scope of the embodiments.

It is clear that a person skilled in the art can make various modifications and variations to the embodiments without departing from their scope. The embodiments are intended to cover these modifications and variations.

The invention claimed is:

1. A wheel brake apparatus for an electric vehicle, comprising:

a brake unit comprising a brake motor and a brake caliper, wherein the brake motor is configured to drive the brake caliper to clamp a brake disc of the electric vehicle;

a parking unit comprising a parking motor and a locking mechanism configured to lock the brake motor; and a wheel controller configured to:

when the electric vehicle is being parked, control the brake motor to rotate forward to drive the brake caliper to clamp the brake disc; and in response to a clamping force output by the brake caliper after the brake caliper clamps the brake disc being greater than a preset clamping force, control the brake motor to rotate backward and control the parking motor to rotate forward, wherein the parking motor drives the locking mechanism to lock the brake motor while the brake motor rotates backward.

2. The wheel brake apparatus according to claim 1, wherein the wheel controller is further configured to:

in response to a clamping force output by the brake caliper after the brake caliper clamps the brake disc being less than a preset clamping force, control the brake motor to rotate forward to drive the brake caliper to clamp the brake disc again; and in response to the clamping force output by the brake caliper after the brake caliper clamps the brake disc being greater than or equal to the preset clamping force, control the parking unit to lock the brake motor when the brake motor rotates backward.

3. The wheel brake apparatus according to claim 1, wherein the wheel controller is further configured to:

in response to controlling the brake motor and the parking motor to rotate in opposite directions for a first preset duration, control the parking motor to stop rotating and the brake motor to output torque;

after controlling the brake motor to output the torque for a second preset duration, in response to a change in a position angle of a rotor of the brake motor being less than a preset position angle change, stop controlling the brake motor to output the torque; and after controlling the brake motor to output the torque for the second preset duration, in response to the change in the position angle of the rotor of the brake motor being greater than or equal to the preset position angle change, control the parking unit to lock the brake motor.

4. The wheel brake apparatus according to claim 2, wherein the wheel controller is configured to:

output a clamping signal and a parking drive signal in response to a parking control signal, wherein the parking control signal is used to indicate that the electric vehicle is in a parked state, the clamping signal is used to control the brake motor to drive the brake caliper to clamp the brake disc, and the parking drive signal is used to control the parking unit to lock the brake motor when the clamping force output by the brake caliper is greater than the preset clamping force.

5. The wheel brake apparatus according to claim 1, wherein a change in a rotor angle in a process in which the brake motor drives the brake caliper to clamp the brake disc is greater than a change in a rotor angle in a process in which the brake motor and the parking motor rotate in opposite directions; or an increase in a clamping force output by the brake caliper in a process in which the brake motor drives the brake caliper to clamp the brake disc is greater than a decrease in a clamping force output by the brake caliper in a process in which the brake motor and the parking motor rotate in opposite directions.

6. The wheel brake apparatus according to claim 1, wherein a rotation speed of the brake motor in a process in which the brake motor drives the brake caliper to clamp the brake disc is greater than a rotation speed of the brake motor in a process in which the brake motor and the parking motor rotate in opposite directions.

7. The wheel brake apparatus according to claim 1, wherein the locking mechanism further comprises a pawl and a ratchet-wheel, the pawl is connected to a rotor of the parking motor, the ratchet-wheel is sleeved on the brake motor, and the parking motor is configured to drive the pawl to engage with the ratchet-wheel when the parking unit is configured to lock the brake motor.

8. The wheel brake apparatus according to claim 1, further comprising:

a clamping force sensor, wherein the wheel controller is configured to receive a clamping force signal from the clamping force sensor and the clamping force signal is used to indicate the clamping force output by the brake caliper.

9. The wheel brake apparatus according to claim 1, wherein the wheel controller is further configured to:

in response to an unlocking control signal, control the parking unit to unlock the brake motor, wherein the unlocking control signal is used to indicate that the electric vehicle cancels the parked state; and after controlling the parking unit to unlock the brake motor for a preset duration, in response to a change in a position angle of a rotor of the brake motor being less than a preset position angle change, control the parking unit to unlock the brake motor.

10. The wheel brake apparatus according to claim 1, wherein the wheel controller is further configured to:

output a parking failure alarm signal in response to the brake motor remaining unlocked after a parking signal is received for a third preset duration, wherein the parking failure alarm signal is used to indicate that parking fails; and output an unlocking failure alarm signal in response to the brake motor remaining locked after an unlocking signal is received for the third preset duration, wherein the unlocking failure alarm signal is used to indicate that unlocking fails.

11. A parking control method for an electric vehicle, comprising-:

controlling a brake motor to rotate forward to drive a brake caliper to clamp a brake disc; and in response to a clamping force output by the brake caliper after the brake caliper clamps the brake disc being greater than a preset clamping force, controlling the brake motor to rotate backward and controlling a parking motor to rotate forward, wherein the parking motor drives a locking mechanism to lock the brake motor while the brake motor rotates backward.

12. The control method according to claim 11, further comprising:

in response to controlling the brake motor to rotate backward and controlling the parking motor to rotate forward for a first preset duration, controlling the brake motor to output torque;

in response to a change in a position angle of a rotor of the brake motor being greater than a preset rotor position angle change after the brake motor outputs the torque for a second preset duration, controlling the brake motor to rotate backward and controlling the parking motor to rotate forward, wherein the parking motor drives the locking mechanism to lock the brake motor while the brake motor rotates backward; and in response to the change in the position angle of the rotor of the brake motor being less than or equal to the preset rotor position angle change after the brake motor outputs the torque for the second preset duration, controlling the brake motor to stop outputting the torque.

13. An electromechanical brake system for an electric vehicle, comprising:

a wheel brake apparatus comprising:

a brake unit, wherein the brake unit comprises a brake motor and a brake caliper and the brake motor is configured to drive the brake caliper to clamp a brake disc of the electric vehicle;

a parking unit comprising a parking motor and a locking mechanism configured to lock the brake motor; and a wheel controller configured to:

when the electric vehicle is being parked, control the brake motor to rotate forward to drive the brake caliper to clamp the brake disc; and in response to a clamping force output by the brake caliper after the brake caliper clamps the brake disc being greater than a preset clamping force, control the brake motor to rotate backward and control the parking motor to rotate forward, wherein the parking motor drives the locking mechanism to lock the brake motor while the brake motor rotates backward; and a central controller, configured to:

in response to a brake signal, control the brake motor to drive the brake caliper to clamp the brake disc, wherein the brake signal is used to indicate that the electric vehicle is in a braking state;

output a parking control signal in response to a parking signal, wherein the parking signal is used to indicate that the electric vehicle enters a parked state; and output an unlocking control signal in response to an unlocking signal, wherein the unlocking signal is used to indicate that the electric vehicle exits the parked state.

14. The electromechanical brake system according to claim 13, wherein the wheel controller is further configured to:

in response to a clamping force output by the brake caliper after the brake caliper clamps the brake disc being less than a preset clamping force, control the brake motor to rotate forward to drive the brake caliper to clamp the brake disc again; and in response to the clamping force output by the brake caliper after the brake caliper clamps the brake disc being greater than or equal to the preset clamping force, control the parking unit to lock the brake motor when the brake motor rotates backward.

15. The electromechanical brake system according to claim 13, wherein the wheel controller is further configured to:

in response to controlling the brake motor to rotate backward and the parking motor to rotate forward for a first preset duration, control the parking motor to stop rotating and the brake motor to output torque;

after controlling the brake motor to output the torque for a second preset duration, in response to a change in a position angle of a rotor of the brake motor being less than a preset position angle change, stop controlling the brake motor to output the torque; and after controlling the brake motor to output the torque for the second preset duration, in response to the change in the position angle of the rotor of the brake motor being greater than or equal to the preset position angle change, control the brake motor to rotate backward and control the parking motor to rotate forward.

16. The electromechanical brake system according to claim 14, wherein the wheel controller is further configured to:

output a clamping signal and a parking drive signal in response to a parking control signal, wherein the parking control signal is used to indicate that the electric vehicle is in a parked state, the clamping signal is used to control the brake motor to drive the brake caliper to clamp the brake disc, and the parking drive signal is used to control the parking unit to lock the brake motor when the clamping force output by the brake caliper is greater than the preset clamping force.

17. The electromechanical brake system according to claim 13, wherein a change in a rotor angle in a process in which the brake motor drives the brake caliper to clamp the brake disc is greater than a change in a rotor angle in a process in which the brake motor and the parking motor rotate in opposite directions; or an increase in a clamping force output by the brake caliper in a process in which the brake motor drives the brake caliper to clamp the brake disc is greater than a decrease in a clamping force output by the brake caliper in a process in which the brake motor and the parking motor rotate in opposite directions.

18. The electromechanical brake system according to claim 13, wherein a rotation speed of the brake motor in a process in which the brake motor drives the brake caliper to clamp the brake disc is greater than a rotation speed of the brake motor in a process in which the brake motor and the parking motor rotate in opposite directions.

* * * * *